United States Patent
Dang et al.

(10) Patent No.: US 8,761,018 B2
(45) Date of Patent: *Jun. 24, 2014

(54) SYSTEMS AND METHODS FOR THROTTLING A FABRIC LOGIN IN A FIBRE CHANNEL ADAPTER

(75) Inventors: Dung N. Dang, Seattle, WA (US); Steven E. Klein, Tucson, AZ (US); Daniel W. Sherman, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,209

(22) Filed: May 25, 2012

(65) Prior Publication Data
US 2012/0236721 A1    Sep. 20, 2012

Related U.S. Application Data (63) Continuation of application No. 12/902,112, filed on Oct. 11, 2010.

(51) Int. Cl.
*G01R 31/08* (2006.01)
*H04L 12/56* (2006.01)

(52) U.S. Cl.
CPC ............... *H04L 47/10* (2013.01); *H04L 47/30* (2013.01); *H04L 47/32* (2013.01)
USPC ........... 370/235; 370/401; 370/414; 370/415; 701/1; 701/2; 701/4

(58) Field of Classification Search
None
See application file for complete search history.

(56) References Cited

U.S. PATENT DOCUMENTS

| | | | |
|---|---|---|---|
| 7,243,367 B2 | 7/2007 | Kleinsteiber et al. | |
| 7,447,198 B1 | 11/2008 | Banks et al. | |
| 7,457,902 B2* | 11/2008 | Yang et al. | 710/200 |
| 7,577,134 B2 | 8/2009 | Gopal Gowda et al. | |
| 7,602,774 B1 | 10/2009 | Sundaresan et al. | |
| 7,707,309 B2* | 4/2010 | Shanbhag et al. | 709/244 |
| 7,746,787 B2 | 6/2010 | Coffman | |
| 7,760,717 B2 | 7/2010 | Atkinson | |
| 7,773,521 B2* | 8/2010 | Zhang et al. | 370/235 |
| 8,228,820 B2* | 7/2012 | Gopal Gowda et al. | 370/254 |
| 2003/0163692 A1* | 8/2003 | Kleinsteiber et al. | 713/169 |
| 2008/0072309 A1 | 3/2008 | Kleinsteiber et al. | |
| 2008/0313724 A1* | 12/2008 | Doddapaneni et al. | 726/9 |

(Continued)

OTHER PUBLICATIONS

Sang-Min Park et al., "Data Throttling for Data-Intensive Workflows," 978-1-4244-1694-03/08, IEEE, 2008, 11 pages.

*Primary Examiner* — Ian N Moore
*Assistant Examiner* — Latresa McCallum
(74) *Attorney, Agent, or Firm* — Griffiths & Seaton PLLC (57) ABSTRACT

A fabric login (FLOGI) in a Fiber Channel (FC) adapter is throttled. The system includes a first tracking mechanism, a second tracking mechanism, a switch, and an FC adapter. The FC adapter comprises three or more FLOGIs and a controller. First and second FLOGI requests are transmitted to the switch and indicate, via a first tracking mechanism, that a first FLOGI associated with the first FLOGI request and a second FLOGI associated with the second FLOGI request are active. A third FLOGI request is queued until the first FLOGI request or the second FLOGI request is processed by the switch and indicates, via a second tracking mechanism, that a third FLOGI associated with a third FLOGI request is queued.

13 Claims, 3 Drawing Sheets

(56) References Cited

U.S. PATENT DOCUMENTS

| | | |
|---|---|---|
| 2009/0116381 A1 | 5/2009 | Kanda |
| 2009/0274162 A1 | 11/2009 | Gopal Gowda et al. |
| 2010/0103939 A1* | 4/2010 | Carlson et al. ........... 370/395.53 |
| 2010/0166422 A1 | 7/2010 | Shanbhag et al. |

* cited by examiner

SYSTEMS AND METHODS FOR THROTTLING A FABRIC LOGIN IN A FIBRE CHANNEL ADAPTER

CROSS REFERENCE TO RELATED APPLICATIONS

This application is a Continuation of U.S. patent application Ser. No. 12/902,112, filed on Oct. 11, 2010.

FIELD OF THE INVENTION

The present invention relates in general to storage systems, and particularly to, systems and methods for throttling a fabric login (FLOGI) in a Fibre Channel adapter.

DESCRIPTION OF THE RELATED ART

In a Fibre Channel storage area network (SAN), a storage unit device and/or host device accesses the SAN through a switch. To start communicating with a switch, the storage unit device and/or host device and the switch need to perform a fabric login (FLOGI) or fabric initialization. The switch must process a FLOGI request within a timeout tolerance of the attached port in order to avoid various error states. A limiting factor in how quickly a switch can process a FLOGI request is its processing capabilities. The more concurrent FLOGIs a switch has to process, the more of its processing power is utilized and each FLOGI will see a slower response.

In System Z environments, for example, there are situations where a switch cannot handle all FLOGI requests within the specific time frame allowed by the attached device. This may occur for three key reasons: 1) a System Z channel is capable of presenting multiple FLOGIs at once during power on or IPL; 2) a System Z channel has a very strict time limit of 0.5 seconds on receiving the login response; and 3) there is a SB-2 timeout limit of 1.5 seconds which could affect application recovery if logical path issues surface.

To satisfy System Z environments, several switches have implemented restrictions on how many concurrent FLOGIs they can handle. One example of some of these restrictions are: 1) the switch cannot receive two FLOGIs within a two second period; 2) one FLOGI cannot be resent four times within a ten second period; 3) three FLOGIs cannot be held by the switch at one time (e.g., one processed, two queued, three blocked); and/or 4) the switch cannot receive eight FLOGIs within a one second period of time.

In the event of a switch receiving too many FLOGIs at once, some switches have been designed to drop a FLOGI or start sending OLS for links that received a FLOGI above the threshold restriction. This is done to limit the number of FLOGIs the switch has to process at once. Once the switch can process more FLOGIs, it will allow the link to initialize and fabric initialization to occur for that port. However, the total time to process the FLOGI can easily exceed the FLOGI response time requirements of certain hosts (e.g., a System Z), which can lead to loss of access to devices.

For storage devices that are coming online after a system reboot, this does not pose an access problem since the devices were not previously online. However, during concurrent code load (CCL) of the storage devices, the goal is to ensure continued access through the code update. On some storage controllers, all ports on a host adapter will try to re-establish the fabric connection by simultaneously sending out one FLOGI per port. Host adapters with multiple ports therefore have potential issues due to the switch FLOGI restrictions described above, which can impact the link initialization times and cause host access problems if measures are not taken to restrict the number of FLOGIs that are concurrently sent.

SUMMARY OF THE INVENTION

Various embodiments provide systems for throttling a fabric login (FLOGI) in a Fibre Channel adapter. One initialization system comprises a first tracking mechanism, a second tracking mechanism, a switch, and a Fibre Channel adapter coupled to the first tracking mechanism, the second tracking mechanism, and the switch. The Fibre Channel comprises three or more FLOGIs and a controller. In one embodiment, the controller is configured to transmit a first FLOGI request and a second FLOGI request to the switch and indicate, via the first tracking mechanism, that a first FLOGI associated with the first FLOGI request and a second FLOGI associated with the second FLOGI request are active in response to transmitting the first FLOGI request and the second FLOGI request, respectively. The controller is further configured to queue a third FLOGI request until one of the first FLOGI request and the second FLOGI request is processed by the switch and indicate, via the second tracking mechanism, that a third FLOGI associated with the third FLOGI request is queued in response to queuing the third FLOGI request.

Various other embodiments provide methods for throttling a fabric login (FLOGI) in a Fibre Channel adapter coupled to a switch. One method comprises transmitting a first FLOGI request and a second FLOGI request to the switch and indicating, via a first tracking mechanism, that a first FLOGI associated with the first FLOGI request and a second FLOGI associated with the second FLOGI request are active in response to transmitting the first FLOGI request and the second FLOGI request, respectively. The method further comprises queuing a third FLOGI request until one of the first FLOGI request and the second FLOGI request is processed by the switch and indicating, via a second tracking mechanism, that a third FLOGI associated with the third FLOGI request is queued.

Physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising computer program product methods for throttling a fabric login (FLOGI) in a Fibre Channel adapter coupled to a switch are also provided. One computer storage medium comprises computer code for transmitting, by the Fibre Channel adapter, a first FLOGI request and a second FLOGI request to the switch, computer code for indicating, via a first tracking mechanism, that a first FLOGI associated with the first FLOGI request is active in response to transmitting the first FLOGI request, and computer code for indicating, via the first tracking mechanism, that a second FLOGI associated with the second FLOGI request is active in response to transmitting the second FLOGI request. The computer storage medium further comprises computer code for queuing, by the Fibre Channel adapter, a third FLOGI request until one of the first FLOGI request and the second FLOGI request is processed by the switch and computer code for indicating, via a second tracking mechanism, that a third FLOGI associated with the third FLOGI request is queued.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for throttling a fabric login (FLOGI) in a Fibre Channel adapter. Also provided are physical computer storage mediums comprising computer code for throttling a FLOGI in a Fibre Channel adapter coupled to a switch.

Figure 1:
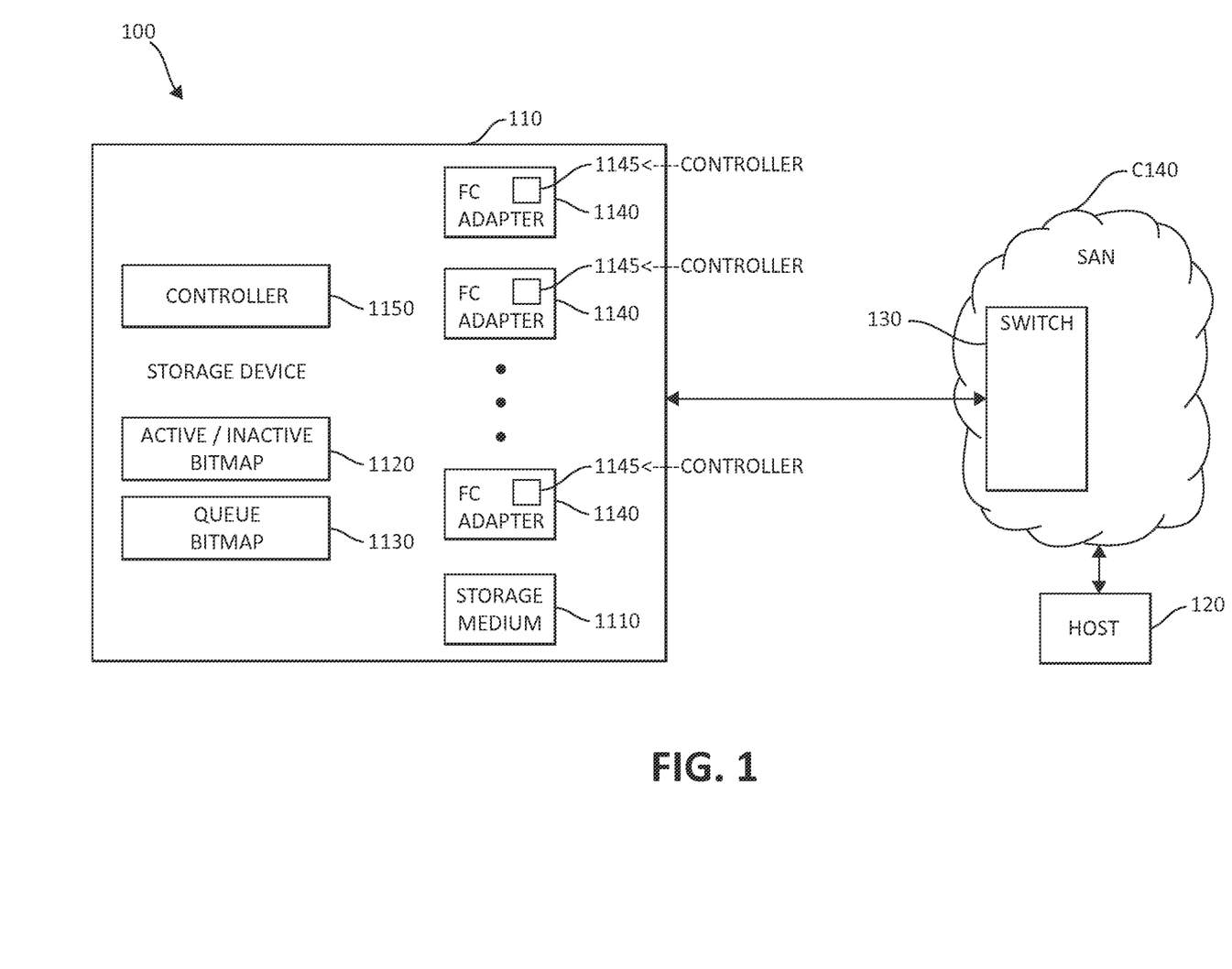
FIG. 1 is a block diagram of one embodiment of a system for throttling a fabric login (FLOGI)

Turning now to the figures, FIG. 1 is a block diagram of one embodiment of a system 100 for throttling a FLOGI. At least in the illustrated embodiment, system 100 comprises a storage device 110 coupled to a host 120 via a switch 130 and a storage area network (SAN) 140.

Storage device 110, in various embodiments, comprises any type of computer-readable storage medium 1110 known in the art or developed in the future. For example, storage device 110 may comprise storage tape, an optical storage device, one or more disk storage devices (e.g., a redundant array of independent disks (RAID) configuration, a just a bunch of disks (JBOD) configuration, etc.), and/or the like computer-readable storage mediums 1110.

At least in the illustrated embodiment, storage device 110 further comprises one or more active/inactive tracking mechanisms 1120, one or more queue tracking mechanisms 1130, a plurality of Fibre Channel (FC) adapters 1140, and a controller 1150 in communication with each other. Active/inactive tracking mechanism(s) 1120 may each be any tracking mechanism known in the art or developed in the future capable of tracking the active/inactive processing status for each FLOGI in the various ports of FC adapters 1140 (discussed below). Examples of active/inactive tracking mechanism(s) 1120 include, but are not limited to, one or more bitmaps, one or more tables, metadata, and/or the like tracking mechanisms.

An "active" status in active/inactive tracking mechanism 1120 indicates that a FLOGI associated with a particular port in an FC adapter 1140 has been transmitted to switch 130 for processing. An "inactive" status in active/inactive tracking mechanism 1120 indicates that the FLOGI associated with the particular port in the FC adapter 1140 has not been transmitted to switch 130 for processing or indicates that the FLOGI has already been processed by switch 130. At an initial time or in a default state, each FLOGI includes an "inactive" status in its respective active/inactive tracking mechanism 1120.

Queue tracking mechanism(s) 1130 may each be any tracking mechanism known in the art or developed in the future capable of tracking the queue status for FLOGIs in the various ports of FC adapters 1120 waiting to be transmitted to switch 130 for processing. Examples of queue tracking mechanism(s) 1130 include, but are not limited to, one or more bitmaps, one or more tables, metadata, and/or the like tracking mechanisms.

A "queued" status in queue tracking mechanism 1130 indicates that a FLOGI associated with a particular port in an FC adapter 1140 has been placed in the queue for transmittal to switch 130. A "released" status in queue tracking mechanism 1130 indicates that the FLOGI associated with the particular port in the FC adapter 1140 has been transmitted to switch 130 for processing. At the time the first two FLOGI requests are transmitted to switch 130 for processing (i.e., the first two FLOGIs are "active"), which is discussed below, each remaining FLOGI includes a "queued" status in its respective queue tracking mechanism 1130. That is, the first two FLOGI requests are not included in queue tracking mechanism 1130 such that the number of FLOGIs in queue tracking mechanism 1130 at the initial time is the total number of FLOGIs minus 2 FLOGIs (i.e., N−2 FLOGIs).

FC adapters 1140 may be any type of Fibre Channel adapter known in the art or developed in the future. In the illustrated embodiment, storage device 110 comprises three FC adapters 1140. In various other embodiments, storage device 110 comprises more than three FC adapters 1140. In still other embodiments, storage device 110 comprises one or two FC adapters 1140.

In one embodiment, each FC adapter 1140 comprises three ports with which to communicate with switch 130. In various other embodiments, each FC adapter 1140 comprises four ports, eight ports, sixteen ports, thirty-two ports, or any binary number of ports. In still other embodiments, FC adapter 1140 may comprise any number of ports greater than three ports.

Each FC adapter 1140 further comprises a controller 1145 configured to manage each FLOGI for the ports of its respective FC adapter 1140. In one embodiment, each controller 1145 is configured to concurrently or serially transmit a two FLOGI requests to switch 130. Each controller 1145 is further configured to indicate, via active/inactive tracking mechanism 1120, that a FLOGI associated with the first FLOGI request is "active" and that a FLOGI associated with the second FLOGI request is active in response to transmitting the first and second FLOGI requests.

The remaining FLOGI requests in the FC adapter 1140 are queued by its processor 1145 until one or both of the two FLOGI requests are processed by switch 130. Each processor 1145 is further configured to indicate, via queue tracking mechanism 1130, that each FLOGI associated with the queued FLOGI requests is queued in response to each controller 1145 queuing the remaining FLOGI requests.

When a controller 1145 receives a notice from switch 130 that a transmitted FLOGI request has been processed by switch 130, the controller 1145 is configured to change the status of the FLOGI in active/inactive tracking mechanism 1120 from the "active" status to the "inactive" status. Each controller 1145 is configured to then transmit the next FLOGI request in the queue to switch 130 after the previous FLOGI is marked with the "inactive" status. The status of the FLOGI associated with the next FLOGI request in active/inactive tracking mechanism 1120 is then changed to the "active" status by processor 1145.

The status of the FLOGI associated with the next FLOGI request in queue tracking mechanism 1130 is then changed from the "queued" status to the "released" status by processor 1145. Each processor 1145 then repeats the transmittal of FLOGI requests to switch 130 until each FLOGI request has been processed by switch 130. In other words, the process is repeated until each FLOGI in queue tracking mechanism 1130 includes the "released" status and has had a notice returned to processor 1145 that each FLOGI request has been processed by switch 130. In this manner, no more than two FLOGI requests are being processed by switch 130 at any one given time.

In the event that a processor 1145 does not receive a notice from switch 130 that a particular FLOGI request has been processed within a predetermined amount of time (i.e., the FLOGI request has "timed out") that is dependent on the needs/requirements of the particular system 100, the processor 1145 is configured to change the status of the FLOGI associated with the "timed out" FLOGI in active/inactive tracking mechanism 1120 from the "active" status to the "inactive" status. Each controller 1145 is configured to then continue transmitting the remaining FLOGI requests in queue tracking mechanism 1130 to switch 130 as discussed above.

Host 120 may be any host and/or client known in the art or developed in the future. Likewise, SAN 140 may include any storage area network configuration known in the art or developed in the future.

Switch 130 is configured to receive FLOGI requests from controllers 1145 and process the FLOGI requests such that each FC adapter 1140 is capable of communicating with one or devices (e.g., host 120) coupled to SAN 140. Switch 130 is further configured to transmit a notice to each respective controller 1145 when each FLOGI request transmitted from the respective controller 1145 has been processed by switch 130.

Controller 1150 is configured to manage the order in which FC adapters 1140 are processed by switch 130. In one embodiment, controller 1150 is configured to enable one FC adapter 1140 at a time to transmit FLOGI requests to switch 130 in the manner discussed above. That is, controllers 1145 and 1150 ensure that switch 130 is responsible for processing a maximum of two FLOGI requests at any given time.

Figure 2:
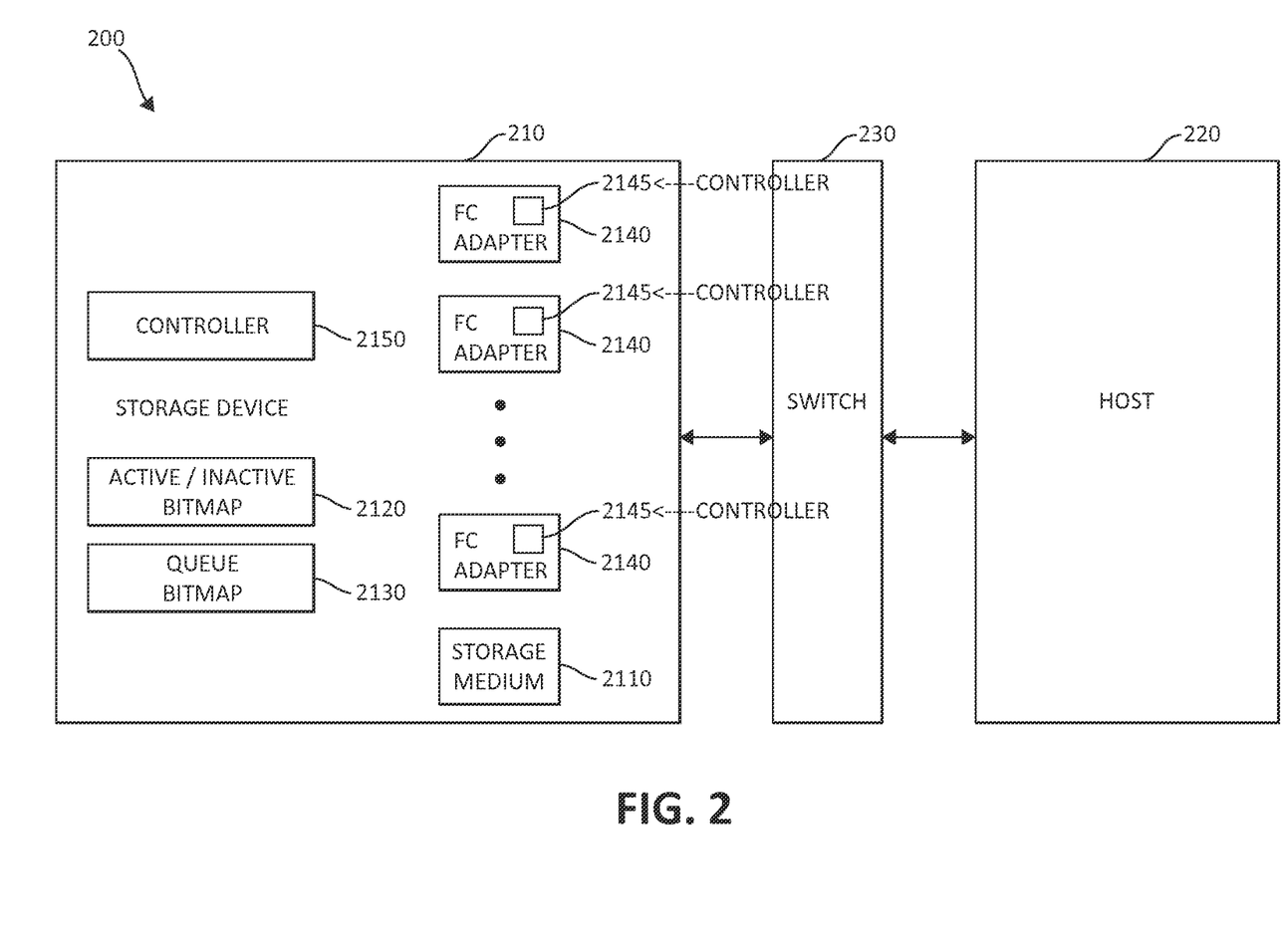
FIG. 2 is a block diagram of another embodiment of a system for throttling a FLOGI.

Turning now to FIG. 2, FIG. 2 is a block diagram of one embodiment of another system 200 for throttling a FLOGI. At least in the illustrated embodiment, system 200 comprises a storage device 210 coupled to a host 220 via a switch 230.

Storage device 210, in various embodiments, comprises any type of computer-readable storage medium 2110 known in the art or developed in the future. For example, storage device 210 may comprise storage tape, an optical storage device, one or more disk storage devices (e.g., a RAID configuration, a JBOD configuration, etc.), and/or the like computer-readable storage mediums 2110.

At least in the illustrated embodiment, storage device 210 further comprises one or more active/inactive tracking mechanisms 2120, one or more queue tracking mechanisms 2130, a plurality of FC adapters 2140, and a controller 2150 in communication with each other. Active/inactive tracking mechanism(s) 2120 may each be any tracking mechanism known in the art or developed in the future capable of tracking the active/inactive processing status for each FLOGI in the various ports of FC adapters 2140 (discussed below). Examples of active/inactive tracking mechanism(s) 2120 include, but are not limited to, one or more bitmaps, one or more tables, metadata, and/or the like tracking mechanisms.

An "active" status in active/inactive tracking mechanism 2120 indicates that a FLOGI associated with a particular port in an FC adapter 2140 has been transmitted to switch 230 for processing. An "inactive" status in active/inactive tracking mechanism 2120 indicates that the FLOGI associated with the particular port in the FC adapter 2140 has not been transmitted to switch 230 for processing or indicates that the FLOGI has already been processed by switch 230. At an initial time or in a default state, each FLOGI includes an "inactive" status in its respective active/inactive tracking mechanism 2120.

Queue tracking mechanism(s) 2130 may each be any tracking mechanism known in the art or developed in the future capable of tracking the queue status for FLOGIs in the various ports of FC adapters 2120 waiting to be transmitted to switch 230 for processing. Examples of queue tracking mechanism(s) 2130 include, but are not limited to, one or more bitmaps, one or more tables, metadata, and/or the like tracking mechanisms.

A "queued" status in queue tracking mechanism 2130 indicates that a FLOGI associated with a particular port in an FC adapter 2140 has been placed in the queue for transmittal to switch 230. A "released" status in queue tracking mechanism 2130 indicates that the FLOGI associated with the particular port in the FC adapter 2140 has been transmitted to switch 230 for processing. At the time the first two FLOGI requests are transmitted to switch 230 for processing (i.e., the first two FLOGIs are "active"), which is discussed below, each remaining FLOGI includes a "queued" status in its respective queue tracking mechanism 2130. That is, the first two FLOGI requests are not included in queue tracking mechanism 2130 such that the number of FLOGIs in queue tracking mechanism 2130 at the initial time is the total number of FLOGIs minus 2 FLOGIs (i.e., N−2 FLOGIs).

FC adapters 2140 may be any type of Fibre Channel adapter known in the art or developed in the future. In the illustrated embodiment, storage device 210 comprises three FC adapters 2140. In various other embodiments, storage device 210 comprises more than three FC adapters 2140. In still other embodiments, storage device 210 comprises one or two FC adapters 2140.

In one embodiment, each FC adapter 2140 comprises three ports with which to communicate with switch 230. In various other embodiments, each FC adapter 2140 comprises four ports, eight ports, sixteen ports, thirty-two ports, or any binary number of ports. In still other embodiments, FC adapter 2140 may comprise any number of ports greater than three ports.

Each FC adapter 2140 further comprises a controller 2145 configured to manage each FLOGI for the ports of its respective FC adapter 2140. In one embodiment, each controller 2145 is configured to concurrently or serially transmit a two FLOGI requests to switch 230. Each controller 2145 is further configured to indicate, via active/inactive tracking mechanism 2120, that a FLOGI associated with the first FLOGI request is "active" and that a FLOGI associated with the second FLOGI request is active in response to transmitting the first and second FLOGI requests.

The remaining FLOGI requests in the FC adapter 2140 are queued by its processor 2145 until one or both of the two FLOGI requests are processed by switch 230. Each processor 2145 is further configured to indicate, via queue tracking mechanism 2130, that each FLOGI associated with the queued FLOGI requests is queued in response to each controller 2145 queuing the remaining FLOGI requests.

When a controller 2145 receives a notice from switch 230 that a transmitted FLOGI request has been processed by switch 230, the controller 2145 is configured to change the status of the FLOGI in active/inactive tracking mechanism 2120 from the "active" status to the "inactive" status. Each controller 2145 is configured to then transmit the next FLOGI request in the queue to switch 230 after the previous FLOGI is marked with the "inactive" status. The status of the FLOGI associated with the next FLOGI request in active/inactive tracking mechanism 2120 is then changed to the "active" status by processor 2145.

The status of the FLOGI associated with the next FLOGI request in queue tracking mechanism 2130 is then changed from the "queued" status to the "released" status by processor 2145. Each processor 2145 then repeats the transmittal of FLOGI requests to switch 230 until each FLOGI request has been processed by switch 230. In other words, the process is repeated until each FLOGI in queue tracking mechanism 2130 includes the "released" status and has had a notice returned to processor 2145 that each FLOGI request has been processed by switch 230. In this manner, no more than two FLOGI requests are being processed by switch 230 at any one given time.

In the event that a processor 2145 does not receive a notice from switch 230 that a particular FLOGI request has been processed within a predetermined amount of time (i.e., the FLOGI request has "timed out") that is dependent on the needs/requirements of the particular system 200, the processor 2145 is configured to change the status of the FLOGI associated with the "timed out" FLOGI in active/inactive tracking mechanism 2120 from the "active" status to the "inactive" status. Each controller 2145 is configured to then continue transmitting the remaining FLOGI requests in queue tracking mechanism 2130 to switch 230 as discussed above.

Host 220 may be any host known in the art or developed in the future. Host 220 may also be considered a "client" of storage device 210, which may include any type of client relationship known in the art or developed in the future.

Switch 230 is configured to receive FLOGI requests from controllers 2145 and process the FLOGI requests such that each FC adapter 2140 is capable of communicating with host 220. Switch 230 is further configured to transmit a notice to each respective controller 2145 when each FLOGI request transmitted from the respective controller 2145 has been processed by switch 230.

Controller 2150 is configured to manage the order in which FC adapters 2140 are processed by switch 230. In one embodiment, controller 2150 is configured to enable one FC adapter 2140 at a time to transmit FLOGI requests to switch 230 in the manner discussed above. That is, controllers 2145 and 2150 ensure that switch 230 is responsible for processing a maximum of two FLOGI requests at any given time.

Figure 3:
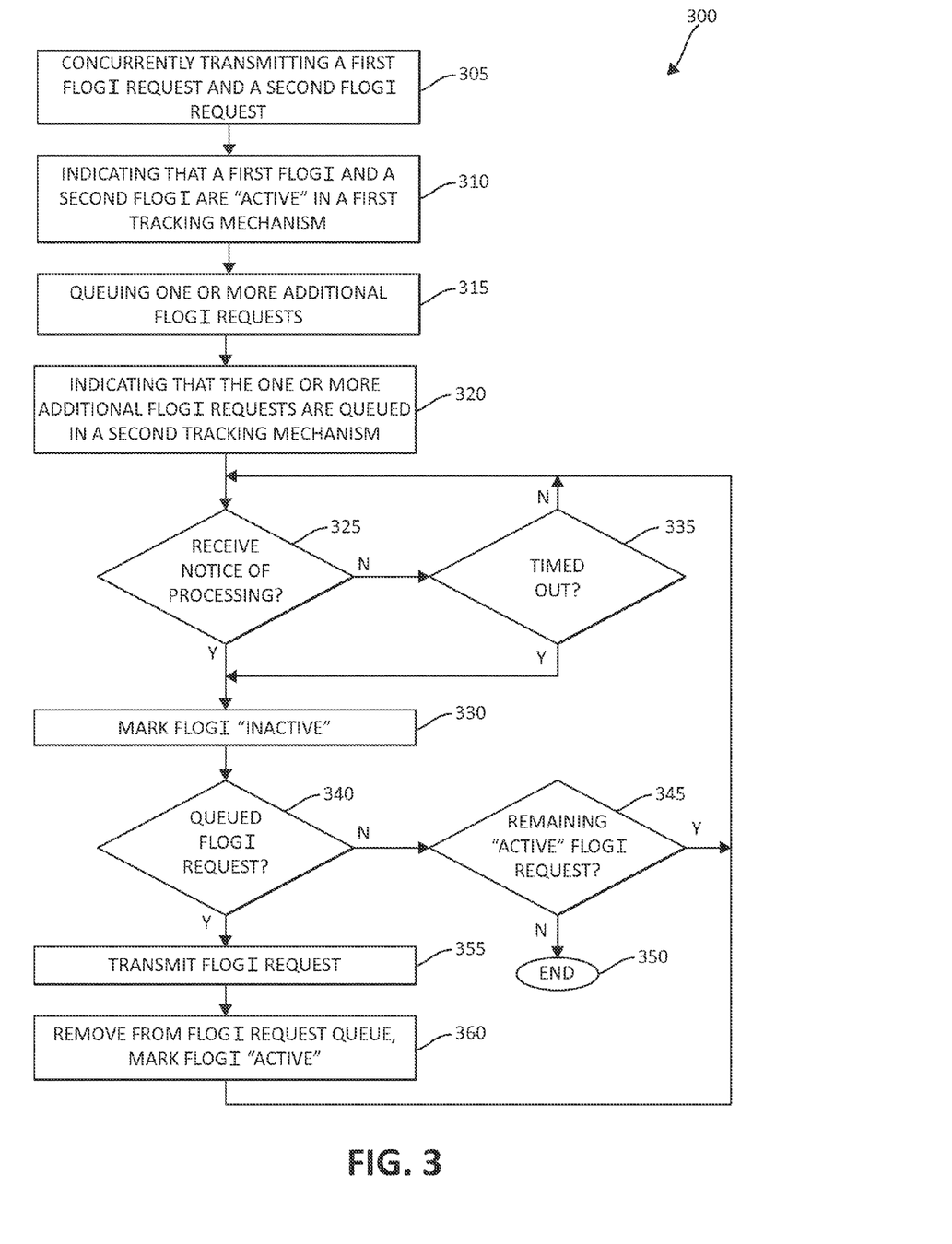
FIG. 3 is a block diagram of one embodiment of a method for throttling a FLOGI in a Fibre Channel adapter.

With reference now to FIG. 3, FIG. 3 is a flow diagram of one embodiment of a method 300 for throttling a FLOGI in a FC adapter (e.g., FC adapter 1140 or FC adapter 2140). At least in the illustrated embodiment, method 300 begins by transmitting a first FLOGI request and a second FLOGI request to a switch (e.g., switch 130 or switch 230) by the FC adapter (block 305). In one embodiment, the first FLOGI request and the second FLOGI request are transmitted concurrently or in parallel with respect to each other. In another embodiment, the first FLOGI request and the second FLOGI request are transmitted in series with respect to one another.

Method 300 further comprises indicating, via an active/inactive tracking mechanism (e.g., active/inactive mechanism 1120 or active/inactive mechanism 2120), that a first FLOGI associated with the first FLOGI request and a second FLOGI associated with the second FLOGI request include an "active" status in response to transmitting the first FLOGI request and the second FLOGI request, respectively (block 310). Method 300 further comprises queuing one or more additional FLOGI requests until the first FLOGI request and/or the second FLOGI request is processed by the switch (block 315) and indicating, via a queue tracking mechanism (e.g., queue mechanism 1130 or queue mechanism 2130), that the FLOGIs associated with the additional FLOGI requests are queued (block 320).

In one embodiment, method further comprises determining if a notice has been received, the notice indicating that the switch processed the first FLOGI request and/or the second FLOGI request (block 325). If the notice has been received, method 300 includes marking the FLOGI associated with the processed FLOGI request with the "inactive" status (block 330). If the notice has not been received, method 300 continues by determining if the first FLOGI request and/or the second FLOGI request has timed out (block 335).

If the FLOGI request has not timed out, method 300 returns to determining if the notice has been received (block 325). If the FLOGI request has timed out, method 300 includes marking the FLOGI associated with the processed FLOGI request with the "inactive" status (block 330).

After the processed FLOGI request includes the "inactive" status, method 300 determines if there is one or more queued FLOGI requests (block 340). If there are no queued FLOGI requests, method 300 continues by determining if there are any remaining "active" FLOGI requests (block 345). If there are no remaining "active" FLOGI requests, method 300 ends (block 350). If there remains an "active" FLOGI request, method 300 returns to determining if a notice indicating that the switch processed the latest transmitted FLOGI request has been received (block 325).

If there are one or more queued FLOGI requests, method 300 continues by transmitting one of the queued FLOGI requests (block 355). The FLOGI associated with the transmitted FLOGI request is marked with the "released" status in the queue tracking mechanism and the status of the FLOGI is changed to the "active" status in the active/inactive tracking mechanism (block 360). Method 300 then returns to determining if a notice indicating that the switch processed the latest transmitted FLOGI request has been received (block 325).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for throttling a fabric login (FLOGI) in a Fibre Channel adapter coupled to a switch, the method comprising:
transmitting, by the Fibre Channel adapter, a first FLOGI request and a second FLOGI request to the switch;
indicating, via a first queuing tracking mechanism, that a first FLOGI associated with the first FLOGI request is active in response to transmitting the first FLOGI request;
indicating, via the first queuing tracking mechanism, that a second FLOGI associated with the second FLOGI request is active in response to transmitting the second FLOGI request;
queuing, by the Fibre Channel adapter, a third FLOGI request until one of the first FLOGI request and the second FLOGI request is processed by the switch; and
indicating, via a second queuing tracking mechanism, that a third FLOGI request associated with the third FLOGI request is queued in response to queuing the third FLOGI request;
queuing, by the Fibre Channel adapter, a fourth FLOGI request until the other respective one of the first FLOGI request and the second FLOGI request is processed by the switch; and
indicating, via the second queuing tracking mechanism, that a fourth FLOGI associated with the fourth FLOGI request is queued in response to queuing the fourth FLOGI request;
receiving a first notice, by the Fibre Channel adapter, that one of the first FLOGI request and the second FLOGI request has been processed by the switch;
indicating, via the first queuing tracking mechanism, that one of the first FLOGI and the second FLOGI is inactive in response to receiving the first notice that the one of the first FLOGI request and the second FLOGI request has been processed by the switch;
receiving a second notice, by the Fibre Channel adapter, that the other respective one of the first FLOGI request and the second FLOGI request has been processed by the switch; and
indicating, via the first queuing tracking mechanism, that the other respective one of the first FLOGI and the second FLOGI is inactive in response to receiving the notice that the other respective one of the first FLOGI request and the second FLOGI request has been processed by the switch;
transmitting, by the Fibre Channel, the third FLOGI request to the switch in response to the indication that the one of the first FLOGI and the second FLOGI is inactive;
indicating, via the first queuing tracking mechanism, that the third FLOGI request is active in response to transmitting the third FLOGI request;

transmitting, by the Fibre Channel, the fourth FLOGI request to the switch in response to the indication that the other respective one of the first FLOGI and the second FLOGI is inactive;
indicating, via the second queuing tracking mechanism, that the fourth FLOGI request is not queued in response to transmitting the fourth FLOGI request; and
indicating, via the first queuing tracking mechanism, that the fourth FLOGI is active in response to transmitting the fourth FLOGI request.

2. The method of claim 1, further comprising:
receiving a notice, by the Fibre Channel adapter, that one of the first FLOGI request and the second FLOGI request has been processed by the switch; and
indicating, via the first queuing tracking mechanism, that the first FLOGI or the second FLOGI is inactive in response to receiving the notice that the one of the first FLOGI request and the second FLOGI request has been processed by the switch.

3. The method of claim 2, further comprising:
transmitting, by the Fibre Channel adapter, the third FLOGI request to the switch in response to the indication that the first FLOGI or the second FLOGI is inactive;
indicating, via the second queuing tracking mechanism, that the third FLOGI request is not queued in response to transmitting the third FLOGI request; and
indicating, via the first queuing tracking mechanism, that the third FLOGI request is active in response to transmitting the third FLOGI request.

4. The method of claim 1, further comprising:
detecting that a notice indicating that one of the first FLOGI request and the second FLOGI request has been processed by the switch has not been received within a predetermined amount of time;
indicating, via the first queuing tracking mechanism, that the first FLOGI or the second FLOGI is inactive in response to detecting that the notice has not been received within the predetermined amount of time; and
transmitting, by the Fibre Channel, the third FLOGI request to the switch in response to the indication that the one of the first FLOGI and the second FLOGI is inactive.

5. A system for throttling a fabric login (FLOGI), comprising:
a first queuing tracking mechanism;
a second queuing tracking mechanism;
a switch; and
a Fibre Channel adapter coupled to the first queuing tracking mechanism, the second queuing tracking mechanism, and the switch and a storage area network (SAN), wherein the Fibre Channel comprises three or more FLOGIs and a controller configured to:
transmit a first FLOGI request and a second FLOGI request to the switch;
indicate, via the first queuing tracking mechanism, that a first FLOGI associated with the first FLOGI request is active in response to transmitting the first FLOGI request;
indicate, via the first queuing tracking mechanism, that a second FLOGI associated with the second FLOGI request is active in response to transmitting the second FLOGI request;
queue a third FLOGI request until one of the first FLOGI request and the second FLOGI request is processed by the switch; and
indicate, via the second queuing tracking mechanism, that a third FLOGI associated with the third FLOGI request is queued in response to queuing the third FLOGI request;
the controller is further configured to:
queue a fourth FLOGI request until the other respective one of the first FLOGI request and the second FLOGI request is processed by the switch; and
indicate, via the second queuing tracking mechanism, that a fourth FLOGI associated with the fourth FLOGI request is queued in response to queuing the fourth FLOGI request;
receive a first notice that one of the first FLOGI request and the second FLOGI request has been processed by the switch;
indicate, via the first queuing tracking mechanism, that one of the first FLOGI and the second FLOGI is inactive in response to receiving the first notice that the one of the first FLOGI request and the second FLOGI request has been processed by the switch;
receive a second notice that the other respective one of the first FLOGI request and the second FLOGI request has been processed by the switch; and
indicate, via the first queuing tracking mechanism, that the other respective one of the first FLOGI and the second FLOGI is inactive in response to receiving the notice that the other respective one of the first FLOGI request and the second FLOGI request has been processed by the switch;
the controller is further configured to:
transmit the third FLOGI request to the switch in response to the indication that the one of the first FLOGI and the second FLOGI is inactive;
indicate, via the second queuing tracking mechanism, that the third FLOGI request is not queued in response to transmitting the third FLOGI request;
transmit the fourth FLOGI request to the switch in response to the indication that the other respective one of the first FLOGI and the second FLOGI is inactive;
indicate, via the second queuing tracking mechanism, that the fourth FLOGI request is not queued in response to transmitting the fourth FLOGI request; and
indicate, via the first queuing tracking mechanism, that the fourth FLOGI is inactive in response to transmitting the fourth FLOGI request.

6. The system of claim 5, wherein the controller is further configured to:
receive a notice that one of the first FLOGI request and the second FLOGI request has been processed by the switch; and
indicate, via the first queuing tracking mechanism, that the first FLOGI or the second FLOGI is inactive in response to receiving the notice that the one of the first FLOGI request and the second FLOGI request has been processed by the switch.

7. The system of claim 6, wherein the controller is further configured to:
transmit the third FLOGI request to the switch in response to the indication that the first FLOGI or the second FLOGI is inactive;
indicate, via the second queuing tracking mechanism, that the third FLOGI request is not queued in response to transmitting the third FLOGI request; and
indicate, via the first queuing tracking mechanism, that the third FLOGI is active in response to transmitting the third FLOGI request.

8. The system of claim 5, wherein the controller is further configured to:
- detect that a notice indicating that one of the first FLOGI request and the second FLOGI request has been processed by the switch has not been received within a predetermined amount of time;
- indicate, via the first queuing tracking mechanism, that the first FLOGI or the second FLOGI is inactive in response to detecting that the notice has not been received within the predetermined amount of time; and
- transmit the third FLOGI request to the switch in response to the indication that the one of the first FLOGI and the second FLOGI is inactive.

9. A physical non-transitory computer storage medium comprising a computer program product method for throttling a fabric login (FLOGI) in a Fibre Channel adapter coupled to a switch and a storage area network (SAN), the computer storage medium comprising:
- computer code for transmitting, by the Fibre Channel adapter, a first FLOGI request and a second FLOGI request to the switch;
- computer code for indicating, via a first queuing tracking mechanism, that a first FLOGI associated with the first FLOGI request is active in response to transmitting the first FLOGI request;
- computer code for indicating, via the first queuing tracking mechanism, that a second FLOGI associated with the second FLOGI request is active in response to transmitting the second FLOGI request;
- computer code for queuing, by the Fibre Channel adapter, a third FLOGI request until one of the first FLOGI request and the second FLOGI request is processed by the switch; and
- computer code for indicating, via a second queuing tracking mechanism, that a third FLOGI associated with the third FLOGI request is queued in response to queuing the third FLOGI request.;
- computer code for queuing, by the Fibre Channel adapter, a fourth FLOGI request until the other respective one of the first FLOGI request and the second FLOGI request is processed by the switch;
- computer code for indicating, via the second queuing tracking mechanism, that a fourth FLOGI associated with the fourth FLOGI request is queued in response to queuing the fourth FLOGI request;
- computer code for receiving a first notice, by the Fibre Channel adapter, that one of the first FLOGI request and the second FLOGI request has been processed by the switch;
- computer code for indicating, via the first queuing tracking mechanism, that one of the first FLOGI and the second FLOGI is inactive in response to receiving the first notice that the one of the first FLOGI request and the second FLOGI request has been processed by the switch;
- computer code for receiving a second notice, by the Fibre Channel adapter, that the other respective one of the first FLOGI request and the second FLOGI request has been processed by the switch; and
- computer code for indicating, via the first queuing tracking mechanism, that the other respective one of the first FLOGI and the second FLOGI is inactive in response to receiving the notice that the other respective one of the first FLOGI request and the second FLOGI request has been processed by the switch.

10. The physical computer storage medium of claim 9, further comprising:
- computer code for receiving a notice, by the Fibre Channel adapter, that one of the first FLOGI request and the second FLOGI request has been processed by the switch; and
- computer code for indicating, via the first queuing tracking mechanism, that the first FLOGI or the second FLOGI is inactive in response to receiving the notice that the one of the first FLOGI request and the second FLOGI request has been processed by the switch.

11. The physical computer storage medium of claim 10, further comprising:
- computer code for transmitting, by the Fibre Channel, the third FLOGI request to the switch in response to the indication that the first FLOGI or the second FLOGI is inactive;
- computer code for indicating, via the second queuing tracking mechanism, that the third FLOGI request is not queued in response to transmitting the third FLOGI request; and
- computer code for indicating, via the first queuing tracking mechanism, that the third FLOGI is active in response to transmitting the third FLOGI request.

12. The physical computer storage medium of claim 9, further comprising:
- computer code for transmitting, by the Fibre Channel, the third FLOGI request to the switch in response to the indication that one of the first FLOGI and the second FLOGI is inactive;
- computer code for indicating, via the second queuing tracking mechanism, that the third FLOGI request is not queued in response to transmitting the third FLOGI request;
- computer code for indicating, via the first queuing tracking mechanism, that the third FLOGI is active in response to transmitting the third FLOGI request;
- computer code for transmitting, by the Fibre Channel, the fourth FLOGI request to the switch in response to the indication that the other respective one of the first FLOGI and the second FLOGI is inactive;
- computer code for indicating, via the second queuing tracking mechanism, that the fourth FLOGI request is not queued in response to transmitting the fourth FLOGI request; and
- computer code for indicating, via the first queuing tracking mechanism, that the fourth FLOGI is active in response to transmitting the fourth FLOGI request.

13. The physical computer storage medium of claim 9, further comprising:
- computer code for detecting that a notice indicating that one of the first FLOGI request and the second FLOGI request has been processed by the switch has not been received within a predetermined amount of time;
- computer code for indicating, via the first queuing tracking mechanism, that the first FLOGI or the second FLOGI is inactive in response to detecting that the notice has not been received within the predetermined amount of time; and
- computer code for transmitting, by the Fibre Channel, the third FLOGI request to the switch in response to the indication that one of the first FLOGI and the second FLOGI is inactive.

* * * * *